(12) United States Patent
Embry et al.

(10) Patent No.: US 8,371,380 B2
(45) Date of Patent: Feb. 12, 2013

(54) STEAM ASSISTED OIL RECOVERY AND CARBON DIOXIDE CAPTURE

(75) Inventors: Dale L. Embry, Houston, TX (US); David C. LaMont, Calgary (CA); James P. Seaba, Bartlesville, OK (US); Richard L. Anderson, Bartlesville, OK (US); Kristin Ruth Anderson, legal representative, Los Angeles, CA (US)

(73) Assignee: ConocoPhillips Company, Houston, TX (US)

( * ) Notice: Subject to any disclaimer, the term of this patent is extended or adjusted under 35 U.S.C. 154(b) by 345 days.

(21) Appl. No.: 12/709,083

(22) Filed: Feb. 19, 2010

(65) Prior Publication Data

US 2010/0206565 A1 Aug. 19, 2010

Related U.S. Application Data

(60) Provisional application No. 61/153,854, filed on Feb. 19, 2009.

(51) Int. Cl.
*E21B 43/24* (2006.01)

(52) U.S. Cl. ........... 166/272.3; 166/57; 166/75.12; 166/267; 166/302

(58) Field of Classification Search .............. None
See application file for complete search history.

(56) References Cited

U.S. PATENT DOCUMENTS

| | | | |
|---|---|---|---|
| 4,149,940 A | 4/1979 | Pinto | |
| 4,725,380 A | 2/1988 | Pinto | |
| 6,536,523 B1 | 3/2003 | Kresnyak et al. | |
| 6,988,549 B1 | 1/2006 | Babcock | |
| 7,066,254 B2 | 6/2006 | Vinegar et al. | |
| 2006/0032630 A1 | 2/2006 | Heins | |
| 2007/0209367 A1 | 9/2007 | Bell et al. | |
| 2007/0237696 A1* | 10/2007 | Payton | 423/228 |
| 2007/0261844 A1* | 11/2007 | Cogliandro et al. | 166/248 |

FOREIGN PATENT DOCUMENTS

WO  WO2008049201  5/2008

* cited by examiner

*Primary Examiner* — Zakiya W Bates
(74) *Attorney, Agent, or Firm* — ConocoPhillips Company

(57) ABSTRACT

Methods and systems relate to generating a flow of steam and splitting the flow of steam to enable both its injection into a formation to assist in oil recovery and its introduction into a pathway where the steam is used for generating electricity and capturing carbon dioxide ($CO_2$). At least part of the $CO_2$ that is captured comes from burning of fuel used to generate the steam. Steam assisted gravity drainage requires the steam that is injected to have a higher pressure than the steam that is needed for $CO_2$ capture. Exhaust steam from a steam turbine used to generate the electricity reduces pressure of the steam prior to use of the steam for capturing $CO_2$.

19 Claims, 2 Drawing Sheets

STEAM ASSISTED OIL RECOVERY AND CARBON DIOXIDE CAPTURE

CROSS-REFERENCE TO RELATED APPLICATIONS

None

STATEMENT REGARDING FEDERALLY SPONSORED RESEARCH OR DEVELOPMENT

None

FIELD OF THE INVENTION

Embodiments of the invention relate to methods and systems for steam assisted oil recovery and carbon dioxide capture.

BACKGROUND OF THE INVENTION

In order to recover oils from certain geologic formations, injection of steam increases mobility of the oil within the formation. An example of such a process is known as steam assisted gravity drainage (SAGD). Oil producers often utilize a once-through steam generator (OTSG) to make the steam by a single-pass of boiler-feed-water through boiler tubes that are heated by gas or oil burners. The OTSG may produce about seventy five percent (75%) quality steam such that output from the OTSG is about 75% vapor and about 25% liquid, by weight percent.

Burning the gas or oil to fuel the burners creates carbon dioxide ($CO_2$), which is a greenhouse gas. Capturing the $CO_2$ facilitates in limiting or preventing emission of the $CO_2$ into the atmosphere, as may be required by government regulations. Various approaches exist to capture the $CO_2$.

In the past, independent processes provide steam for the SAGD and the capture of $CO_2$. Utilizing numerous separate components required to perform the independent processes adds to cost and equipment space. Further, these prior processes tend to be complex and inefficient.

Therefore, a need exists for improved methods and systems for steam injection and $CO_2$ capture.

SUMMARY OF THE INVENTION

In one embodiment, a production system provides integrated steam assisted oil recovery and carbon dioxide capture. The system includes a steam generator capable of producing steam from liquid and having an output for the steam. An injection well drilled into an earth formation is in fluid communication with the output of the steam generator. A steam turbine configured to generate electricity is in fluid communication with the output of the steam generator. Further, a carbon dioxide recovery unit has a steam input in fluid communication with an exhaust of the steam turbine.

According to one embodiment, a method of steam assisted recovering of oil integrated with capturing of carbon dioxide includes generating steam, diverting a first portion of the steam into an injection wellbore, and diverting a second portion of the steam to an electricity generating steam turbine. The method further includes recovering from the steam turbine an exhaust steam flow having a lower pressure relative to the first and second portions of the steam. Supplying the exhaust steam flow to a carbon dioxide recovery unit enables capture of carbon dioxide from a waste stream.

For one embodiment, a production system provides integrated steam assisted oil recovery and carbon dioxide capture. The system includes a steam generator that produces steam from liquid and has an output for the steam. A first separator coupled to the output of the steam generator is disposed to receive a first portion of the steam from the steam generator and has a saturated steam outlet coupled to an injection conduit disposed in a wellbore. A second separator coupled to the output of the steam generator is disposed to receive a second portion of the steam from the steam generator and has a vapor outlet and a condensate outlet. A steam turbine configured to generate electricity operates from fluid flow supplied to the turbine from the vapor outlet of the second separator. A third separator couples to an exhaust of the turbine with vapor from the third separator in fluid communication with a recovered steam line. A fourth separator couples to the condensate outlet of the second separator with vapor from the fourth separator in fluid communication with the recovered steam line. A carbon dioxide recovery unit has an input in fluid communication with the recovered steam line.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to generating a flow of steam and splitting the flow of steam to enable both its injection into a formation to assist in oil recovery and its introduction into a pathway where the steam is used for generating electricity and capturing carbon dioxide ($CO_2$). At least part of the $CO_2$ that is captured comes from burning of fuel used to generate the steam. Steam assisted gravity drainage (SAGD) requires the steam that is injected to have a higher pressure than the steam that is needed for $CO_2$ capture. Exhaust steam from a steam turbine used to generate the electricity reduces pressure of the steam prior to use of the steam for capturing $CO_2$.

Figure 1:
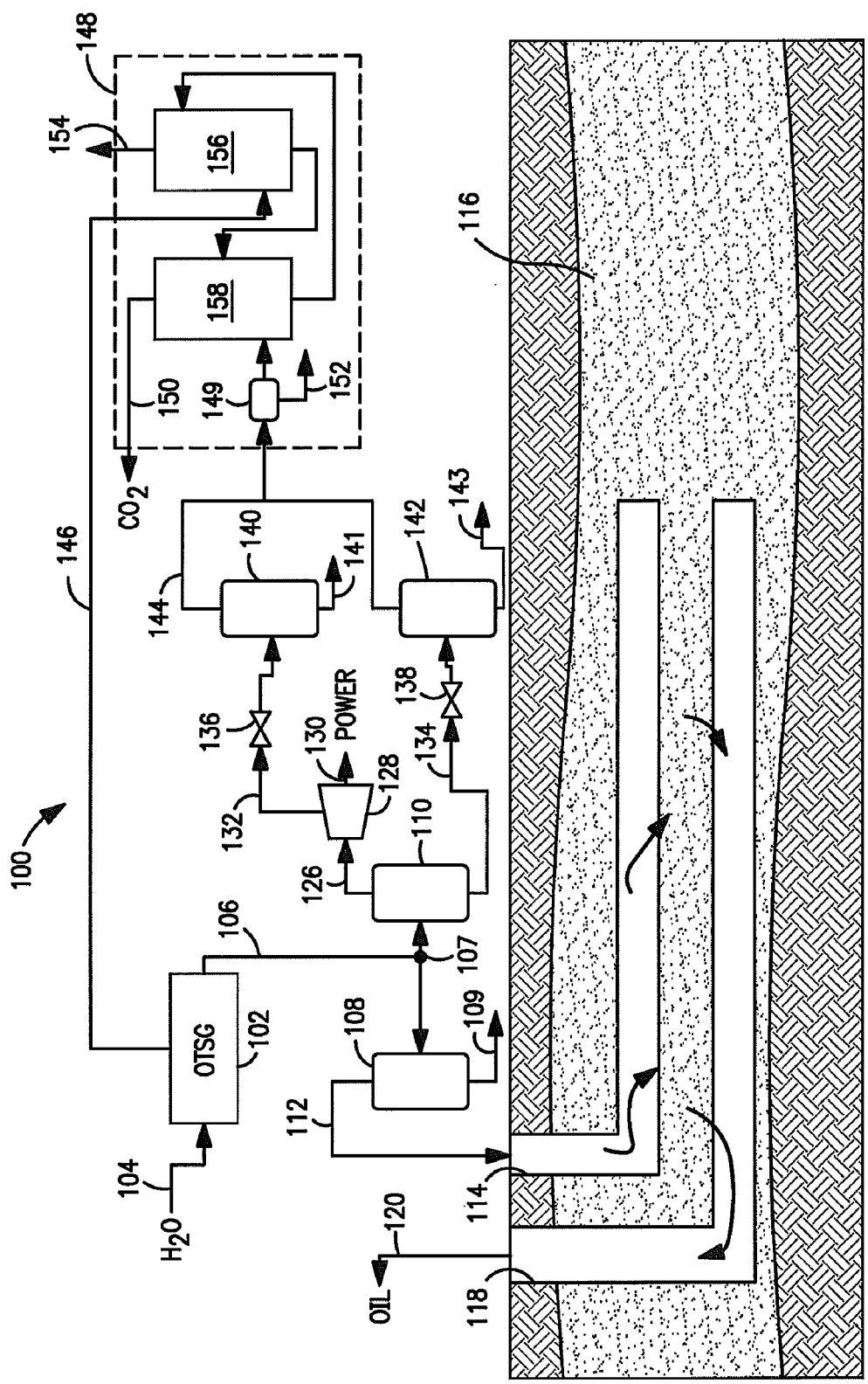
FIG. 1 is a schematic of a production system for integrated steam assisted oil recovery and carbon dioxide capture, according to one embodiment of the invention.

FIG. 1 shows a production system 100 for integrated steam assisted oil recovery and $CO_2$ capture. The system 100 includes a steam generator such as a once-through steam generator (OTSG) 102 that is supplied with boiler-feed-water 104. The OTSG 102 generates steam by a single-pass of the boiler-feed-water 104 through boiler tubes that are heated by gas or oil burners. Unlike steam boilers that need purified water, the OTSG 102 configuration for generating steam prevents or mitigates boiler fowling in locations where water quality is poor. For some embodiments, the OTSG 102 may operate at from about 1000 pounds per square inch gauge (psig) to about 1600 psig based on pressure of the boiler-feed-water 104 being pumped into the OTSG. The OTSG 102 provides a wet steam flow 106 that may be about 70% to about 80% quality steam. While all steam utilized in the system 100 may be supplied through the wet steam flow 106 and provided by the OTSG 102, other types of steam generators may also produce the steam utilized by the system 100.

In some embodiments, a first separator 108 receives part of the wet steam flow 106 while a second separator 110 receives a remainder of the wet steam flow 106. The wet steam flow 106 for some embodiments may be divided by a diverter 107 such that about two-thirds is diverted to the first separator 108 and about one-third is diverted to the second separator 110. Amount of steam supplied by the OTSG 102 and relative demand needed for injection and carbon dioxide capturing determine what percentages of the wet steam flow 106 are diverted between the first and second separators 108, 110. The first and second separators 108, 110 each separate the steam from liquid within the wet steam flow 106.

The OTSG 102 may include several individual conventional OTSG components (i.e., boiler units) connected together. Number of the OTSG components depends on demand for the wet steam flow 106. The OTSG 102 thereby provides sufficient boiler capacity to handle requirements of the system 100 for both injection and carbon dioxide capturing. Conduits connecting the OTSG components may through appropriate piping, such as manifolds and valves (e.g., the diverter 107), combine to form the wet steam flow 106 that is divided as discussed herein. The OTSG 102 may utilize the conventional OTSG components, which typically only produce steam at pressures above 1000 psig, since no separate lower pressure initial steam generation occurs with the system 100. Further, use of the conventional OTSG components for the OTSG 102 enables switching out or performing maintenance on one of the OTSG components without having to shut down operations that can continue while using other ones of the OTSG components. Since all the OTSG components of the OTSG 102 may be alike, the OTSG 102 facilitates maintenance and repair. In particular, common parts and technicians can service the OTSG 102 that may be located in remote locations where technicians and part supplies are limited.

In operation, an injection steam flow 112 from the first separator 108 directs saturated steam at a pressure of 1400 psig, for example, into one or more injection wells 114 to reduce hydrocarbon viscosity within an oil bearing formation 116. The injection steam flow 112 may include the saturated steam alone or in combination with other injectants or solvents. The steam from the injection steam flow 112 eventually condenses to create an oil/water mixture that migrates through the formation 116. The oil/water mixture is gathered at one or more production wells 118 through which the oil/water mixture is brought to surface via production line 120. For some embodiments, the injection well 114 includes a horizontal borehole portion that is disposed above (e.g., 4 to 6 meters above) and parallel to a horizontal borehole portion of the production well 118. Separating the oil/water mixture within the production line 120 provides an oil product.

The second separator 110 provides a power generation steam flow 126 and a second condensate stream 134. The power generation steam flow 126 supplies saturated steam to a letdown turbine 128 configured to generate electricity that is output via a power outlet 130. The power outlet 130 may supply the system 100 with electricity needs and/or may supply electricity to an electrical grid or other nearby production equipment. An exhaust line 132 couples a third separator 140 to the turbine 128 for collection of steam at a lower pressure than the steam in the injection steam flow 112 or the power generation steam flow 126, which are both obtained from the wet steam flow 106 output by the OTSG 102. A first valve 136 disposed along the exhaust line 132 provides flow control to regulate pressure since steam within the exhaust line 132 upon exiting the turbine 128 is higher than desired for use in capturing $CO_2$.

The second condensate stream 134 couples the second separator 110 with a fourth separator 142 to flash part of the liquid from the second separator into steam based on reduction in pressure. A second valve 138 disposed along the second condensate stream 134 illustrates an exemplary flow control device used to facilitate in regulating the pressures. Combined steam output 144 from both the third and fourth separators 140, 142 thereby provides steam having the lower pressure (e.g., between 50 psig and 60 psig) to a $CO_2$ recovery unit 148.

The first, third and fourth separators 108, 140, 142 each produce respective first, third and fourth condensate streams 109, 141, 143. The first, third and fourth condensate streams 109, 141, 143 may be recycled to a water treatment system that partially supplies the boiler-feed-water 104. For some embodiments, the first and second separators 108, 110 may be combined such that the injection and power generation steam flows 112, 126 and the first and second condensate lines 109, 134 are separated from one another accordingly. Any portion of the first condensate line 109 not needed for heat exchange, such as with the boiler-feed-water 104, and recycling may combine with the second condensate line 134 for use in $CO_2$ capturing.

The $CO_2$ recovery unit 148 captures $CO_2$ from flue exhaust gasses output by the OTSG 102. A greenhouse gas waste line 146 thus inputs flue gas exhaust from the OTSG 102 into the $CO_2$ recovery unit 148. While any process may be used to capture the $CO_2$, these processes utilize the steam supplied at the lower pressure through the combined steam output 144. The steam is desired to be at the lower pressure relative to the initial output by the OTSG 102 so that special metallurgy is not required in the $CO_2$ recovery unit 148 to contain pressures and so that desired temperatures based on boiling point of solvents used in the $CO_2$ recovery unit 148 can be achieved.

By way of example, the $CO_2$ recovery unit 148 may utilize a selective amine solution to strip the $CO_2$ from other waste gas components by absorption of the $CO_2$ within the solution. The amine solution comes in direct contact in an absorber 156 with the flue gas exhaust. The other waste gas components pass through the absorber 156 and may exit the $CO_2$ recovery unit 148 via discharge 154 that opens to the atmosphere. Ethanolamine(s) and/or other suitable solvents may be used for the absorber solutions in some embodiments. Once the amine solution has been used to separate the $CO_2$, the amine solution can be regenerated in a regenerator 158 by use of the steam from the combined steam output 144. For some embodiments, liberation of the $CO_2$ from the amine solution may occur with temperature increase and pressure reduction. An indirect reboiler 149 supplies heat from the combined steam output 144 to the regenerator 158. The steam output 144 passes through the reboiler 149 and out a vent 152 without direct contact with the amine solution. A $CO_2$ output 150 from the regenerator 158 of the $CO_2$ recovery unit 148 contains fluid with the $CO_2$ for subsequent compressing and/or sequestering to avoid emitting the $CO_2$ into the atmosphere.

As desired, embodiments of the invention provide the steam at a first pressure for introduction into the injection well 114 while providing the steam at a second pressure relatively lower than the first pressure for use with the $CO_2$ recovery unit 148. In order to drop from the first pressure to the second pressure, the system 100 utilizes the turbine 128 to provide useful electricity without wasting energy. Further, no different steam generators are necessary to supply the steam to the $CO_2$ recovery unit 148.

Figure 2:
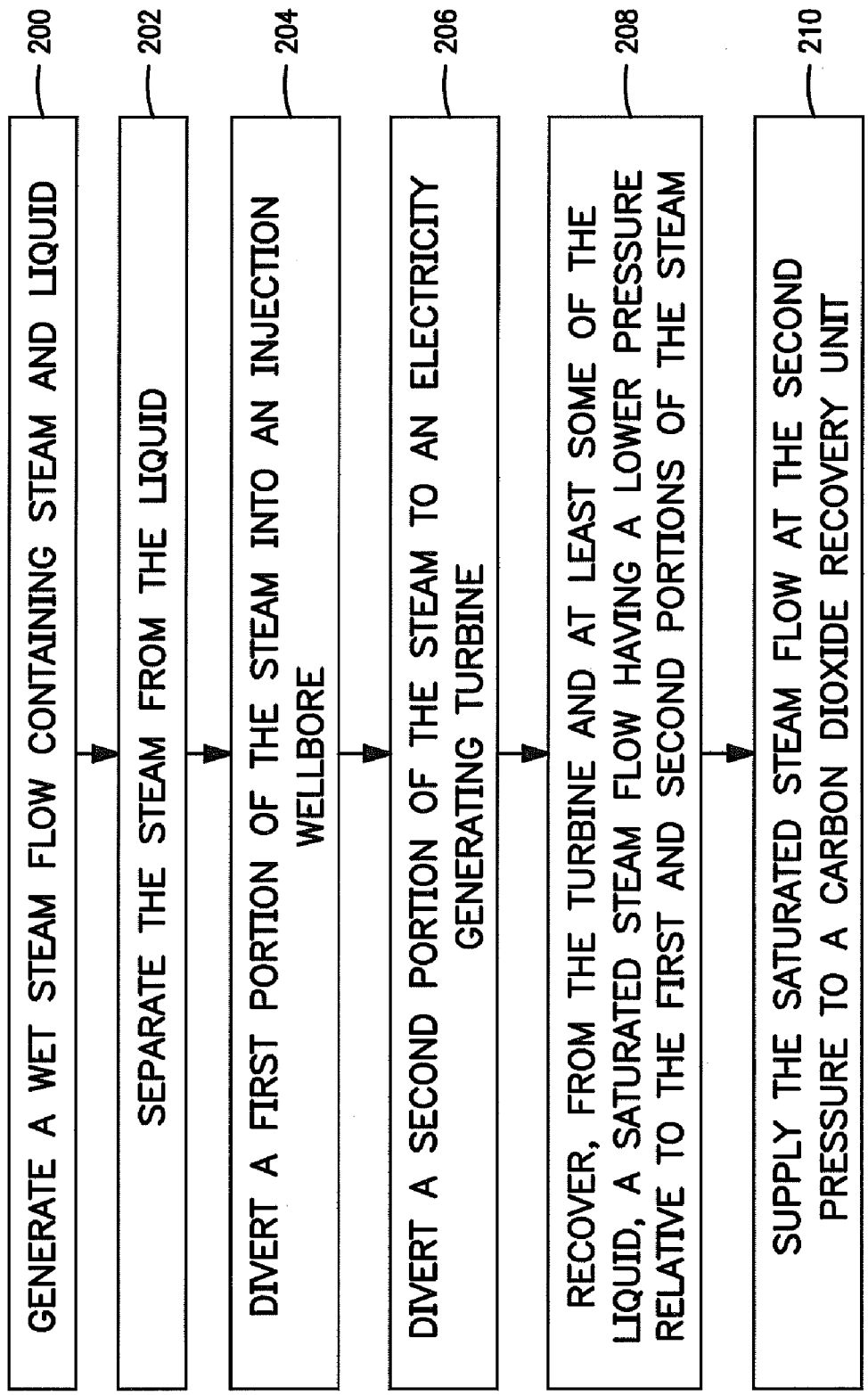
FIG. 2 is a flow chart illustrating a method of capturing carbon dioxide integrated with steam assisted recovering of oil, according to one embodiment of the invention.

FIG. 2 illustrates a method of capturing carbon dioxide integrated with steam assisted recovering of oil using a system such as shown in FIG. 1. The method includes a steam production step 200 in which a flow of wet steam containing both steam and liquid is generated. In separation step 202, separating the steam from the liquid occurs. A first pathway step 204 includes diverting a first portion of the steam into an injection wellbore where the steam is at sufficient pressure to enter a formation and facilitate production of oil from the formation. Upon a second portion of the steam being diverted at a second pathway step 206, the second portion of the steam inputs into an electricity generating turbine. In letdown steam collection step 208, recovering steam from exhaust of the turbine and from at least some of the liquid that is letdown in pressure provides a saturated steam flow having a lower pressure relative to the first and second portions of the steam that is diverted. Supplying the saturated steam flow at the second pressure to a $CO_2$ recovery unit occurs in carbon capture step 210 and facilitates in capturing $CO_2$ from greenhouse gas waste, such as produced in the steam production step 200. In some embodiments, the saturated steam flow regenerates a solvent by stripping the $CO_2$ from the solvent in which the $CO_2$ is absorbed. Once captured, the $CO_2$ may be sequestered by injection into an impermeable reservoir, for example.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A production system for integrated steam assisted oil recovery and carbon dioxide capture, comprising:
   a steam generator capable of producing steam from liquid and having an output for the steam;
   an injection well drilled into an earth formation and in fluid communication with the output of the steam generator;
   a steam turbine configured to generate electricity, wherein the steam turbine is in fluid communication with the output of the steam generator; and
   a carbon dioxide recovery unit having a steam input in fluid communication with an exhaust of the steam turbine, wherein the carbon dioxide recovery unit is based on amine solution stripping of carbon dioxide.

2. The production system according to claim 1, wherein the carbon dioxide recovery unit is coupled to receive carbon dioxide containing flue gasses from the steam generator.

3. The production system according to claim 1, wherein the steam generator comprises a once-through steam generator.

4. The production system according to claim 1, further comprising at least one separator disposed in fluid communication with the output of the steam generator to supply saturated steam to both the injection well and the steam turbine.

5. The production system according to claim 1, further comprising:
   a first separator disposed in fluid communication between the output of the steam generator and the steam turbine; and
   a second separator disposed in fluid communication between a condensate outlet of the first separator and the carbon dioxide recovery unit.

6. The production system according to claim 1, further comprising:
   a first separator disposed in fluid communication between the output of the steam generator and the injection well;
   a second separator disposed in fluid communication between the output of the steam generator and the steam turbine;
   a third separator disposed in fluid communication between an exhaust of the steam turbine and the carbon dioxide recovery unit; and
   a fourth separator disposed in fluid communication between a condensate outlet of the second separator and the carbon dioxide recovery unit.

7. A method of steam assisted recovering of oil integrated with capturing of carbon dioxide, comprising:
   generating steam;
   diverting a first portion of the steam into an injection wellbore;
   diverting a second portion of the steam to an electricity generating steam turbine;
   recovering from the steam turbine an exhaust steam flow having a lower pressure relative to the first and second portions of the steam; and
   supplying the exhaust steam flow to a carbon dioxide recovery unit where the exhaust steam flow enables capture of carbon dioxide from a waste stream.

8. The method according to claim 7, wherein the exhaust steam flow supplied to the carbon dioxide recovery unit is between 50 and 75 pounds per square inch gauge (psig) and the first portion of the steam supplied to the injection well is between 1000 and 1600 psig.

9. The method according to claim 7, wherein generating the steam comprises:
   generating wet steam by a once-through steam generator; and
   separating the steam of the wet steam from liquid of the wet steam.

10. The method according to claim 7, further comprising:
    separating wet steam flow from a steam generator to provide the steam and a condensate flow;
    separating at least some of the condensate flow to provide a recovered steam flow at the lower pressure relative to the first and second portions of the steam; and
    supplying the recovered steam flow together with the exhaust steam flow to the carbon dioxide recovery unit.

11. The method according to claim 7, wherein the waste stream includes carbon dioxide containing flue gasses from the steam generator.

12. The method according to claim 7, wherein the exhaust steam flow strips carbon dioxide from an amine solution within the carbon dioxide recovery unit.

13. The method according to claim 7, wherein the exhaust steam flow strips carbon dioxide from ethanolamines within the carbon dioxide recovery unit.

14. The method according to claim 7, wherein the first portion comprises about two-thirds of the steam that is generated and the second portion comprises about one-third of the steam that is generated.

15. The method according to claim 7, further comprising:
    separating wet steam flow from a steam generator with first and second separators, wherein the first separator receives part of the wet steam flow and provides the first portion of the steam and the second separator receives part of the wet steam flow and provides the second portion of the steam;
    separating exhaust of the steam turbine with a third separator to provide the exhaust steam flow; and
    separating condensate from the second separator with a fourth separator to provide a recovered steam flow supplied with the exhaust steam flow to the carbon dioxide recovery unit.

16. A production system for integrated steam assisted oil recovery and carbon dioxide capture, comprising:
- a steam generator to produce steam from liquid, wherein the steam generator has an output for the steam;
- a first separator coupled to the output of the steam generator, wherein the first separator is disposed to receive a first portion of the steam from the steam generator and has a saturated steam outlet coupled to an injection conduit disposed in a wellbore;
- a second separator coupled to the output of the steam generator, wherein the second separator is disposed to receive a second portion of the steam from the steam generator and has a vapor outlet and a condensate outlet;
- a steam turbine configured to generate electricity and operable from fluid flow supplied to the turbine from the vapor outlet of the second separator;
- a third separator coupled to an exhaust of the turbine, wherein vapor from the third separator is in fluid communication with a recovered steam line;
- a fourth separator coupled to the condensate outlet of the second separator, wherein vapor from the fourth separator is in fluid communication with the recovered steam line; and
- a carbon dioxide recovery unit having an input in fluid communication with the recovered steam line.

17. The production system according to claim 16, wherein the carbon dioxide recovery unit is coupled to receive carbon dioxide containing flue gasses from the steam generator.

18. The production system according to claim 17, wherein the carbon dioxide recovery unit includes a solvent for selective absorption of carbon dioxide from the carbon dioxide containing flue gasses.

19. The production system according to claim 18, wherein the carbon dioxide recovery unit includes an indirect reboiler and the solvent comprises an amine solution strippable of absorbed carbon dioxide by the steam in the reboiler to regenerate the solvent.

* * * * *